No. 726,714. PATENTED APR. 28, 1903.
T. LINKE.
WATER FILTER.
APPLICATION FILED MAY 2, 1900. RENEWED NOV. 12, 1901.
NO MODEL. 2 SHEETS—SHEET 1.
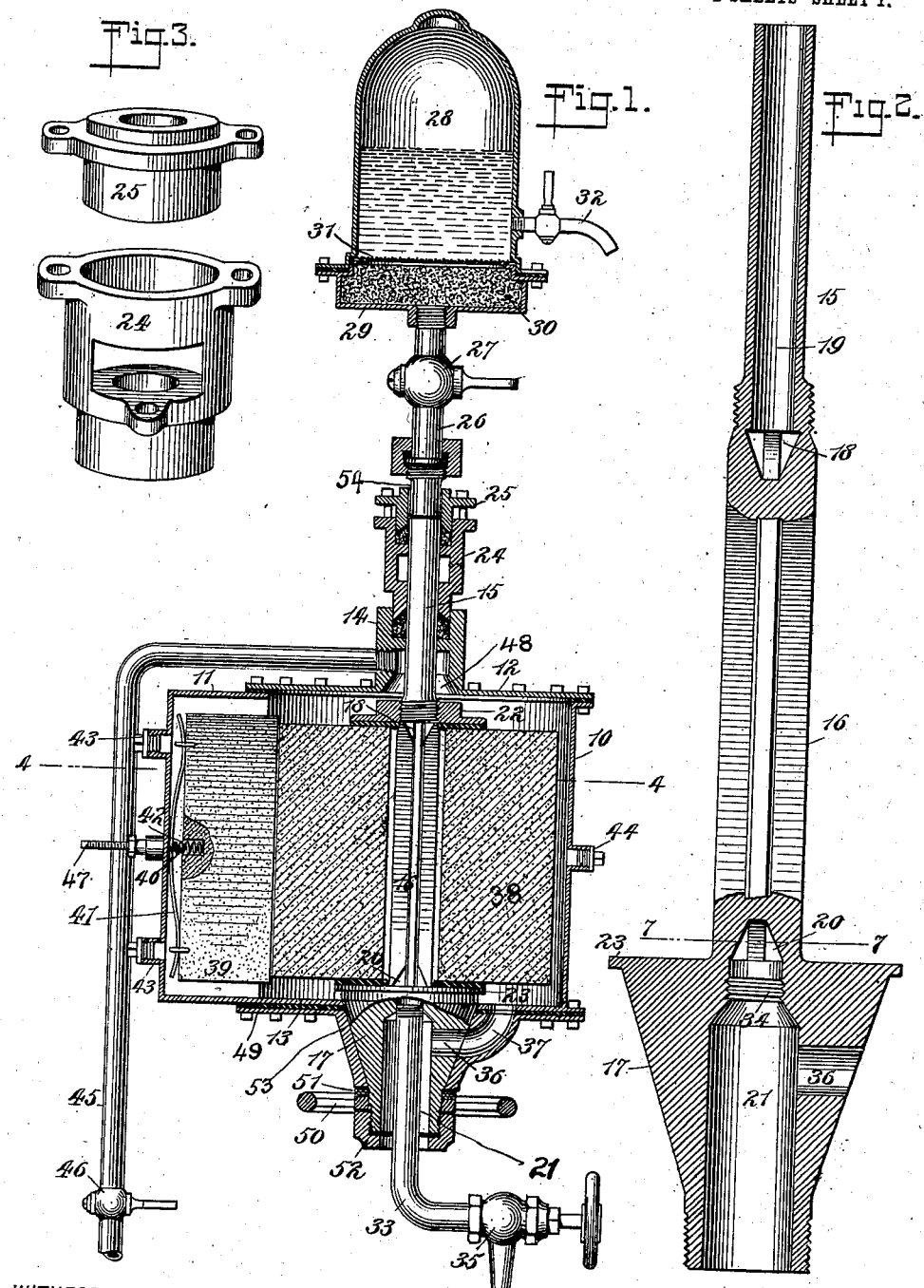
WITNESSES:
Charles Beekman
John S. McNulty
INVENTOR
Theodore Linke
BY
Adam E. Schatz
ATTORNEY No. 726,714. PATENTED APR. 28, 1903.
T. LINKE.
WATER FILTER.
APPLICATION FILED MAY 2, 1900. RENEWED NOV. 12, 1901.
NO MODEL. 2 SHEETS—SHEET 2.
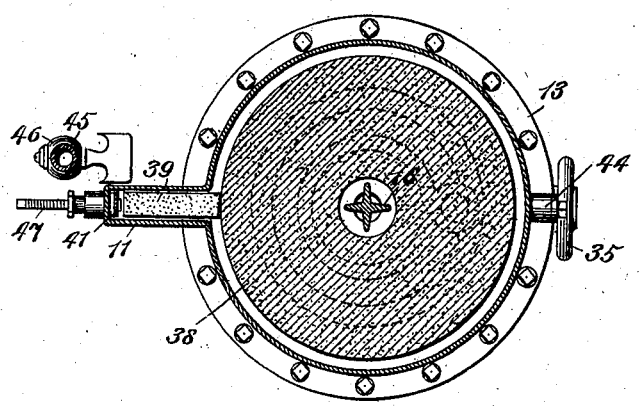
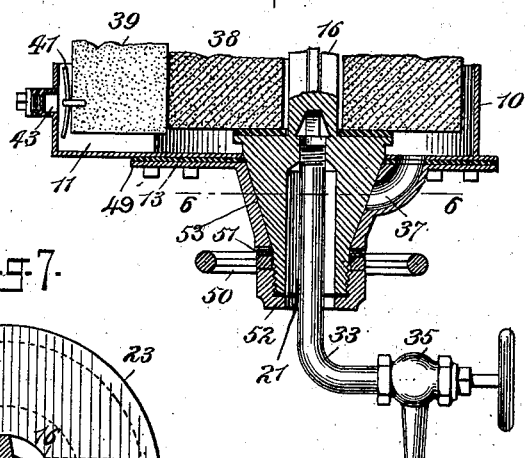
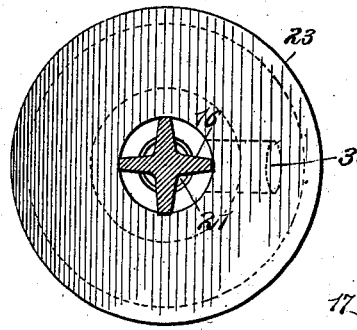
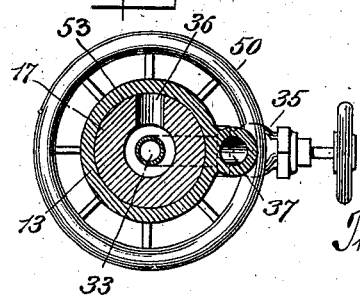
WITNESSES:
Charles Beckman
John S. McNulty
Theodore Linke
INVENTOR
BY Adam E. Schatz
ATTORNEY

UNITED STATES PATENT OFFICE.

THEODORE LINKE, OF NEW YORK, N. Y.

WATER-FILTER.

SPECIFICATION forming part of Letters Patent No. 726,714, dated April 28, 1903

Application filed May 2, 1900. Renewed November 12, 1901. Serial No. 82,037. (No model.)

*To all whom it may concern:*

Be it known that I, THEODORE LINKE, a citizen of the United States, residing in the borough of Manhattan, in the city and county of New York and State of New York, have invented certain new and useful Improvements in Water-Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in water-filters, and has for its principal object the providing of a construction in which a plurality of outlets for the filtered water are formed, one of which leads to an auxiliary receptacle in which it may be stored.

Another object is to provide a filtering-stone support arranged in such manner as to allow the filtered surface thereof to be free from any contacting portions.

Another object is to provide a filtering-stone with a cleansing-stone held in yielding contact with the surface thereof, said stones being arranged to allow one of them to have a rotatable movement relative to the other.

Other objects are the providing of a structure by means of which water may be filtered rapidly, economically, which can be readily cleansed, which will discharge either filtered or unfiltered water, which is simple and efficient in operation, neat and attractive in appearance, durable in construction, and which can be made at a moderate cost.

To these and other ends my invention consists in the improved construction and combination of parts hereinafter fully described, illustrated in the accompanying drawings, and particularly pointed out in the appended claims.

In the drawings, Figure 1 is a central vertical section of a filter constructed in accordance with and embodying the features present in my invention. Fig. 2 is a view showing the stem for holding the filtering-stone in position, including the outlet-ports for the filtered water and also the conical valve formed at the lower end of said stem. Fig. 3 is a view showing in detail the members of the compound stuffing-box, said members being shown separated. Fig. 4 is a horizontal sectional view taken on the line 4 4 of Fig. 1. Fig. 5 is a sectional view similar to Fig. 1, but showing but the lower end of the filter, the conical valve being shown in a different position. Fig. 6 is a horizontal sectional view taken on the line 6 6 of Fig. 5. Fig. 7 is a horizontal sectional view taken on the line 7 7 of Fig. 2.

The present invention is an improvement on the several water-filters heretofore invented by me and is of the same general type—namely, the use of a natural-stone filter mounted to have a pivotal movement, which movement serves to allow the periphery to be cleansed, the water passing either from without to within the stone or vice versa under pressure. These prior constructions, however, were arranged to filter water only when the filtered-water outlet was open or when the pressure in the filtered-water chamber was reduced by the opening of such outlet, and hence the supply of filtered water was somewhat limited, a disadvantage when the demand suddenly becomes greater than the normal supply capacity of the filter. To remedy this, I have provided an auxiliary chamber, into which the water may be passed, (even though the primary outlet is closed,) thus allowing of an accumulation of the filtered water, and in providing this auxiliary chamber I preferably subject the water passing therein to the action of filtering material of a different class, this latter material being intended more particularly to deodorize the filtered water, making it especially applicable for drinking purposes, while the supply obtained through the primary outlet would be applicable for use in other connections—such, for instance, as in cooking, &c. I have also found that in cleansing the surface of the filtering-stone the best results can be obtained by the use of a cleansing-stone instead of metallic means; but as these stones are necessarily soft in spots I find it advantageous to provide a mounting for the cleansing-stone, which will not only allow of its being adjustably moved in contact with the filtering-stone, but which will also allow of a yielding movement independent of the adjusting movement, and in my prior constructions of filters I have generally formed the mounting for the filtering-stone by the use of a perforated pipe leading through the center of the stone, the perforations in the pipe allowing the water to pass into the outlet-pipe; but this is somewhat disadvantageous, inasmuch as the filtered surface is restricted and there is a liability of the water continually remaining between the periphery of the pipe and the stone. In the present construction this is obviated by mounting the stone on its top and bottom surfaces alone, leaving the center entirely free from any contacting portions, strength being given by means of the angular stem passing through the opening in the stone, by means of which the stone can be readily rotated without a tendency of twisting and destroying any of the parts, a result which sometimes obtained with the use of the perforated pipe.

Many other differences appear, as will be plainly apparent upon a reference being had to such prior constructions and to the detailed description of the present construction, which is given below.

In the construction shown in the drawings, 10 designates a cylindrical casing having at one side an offset 11 for the reception of the cleansing-stone 39, hereinafter described. The top and bottom of said casing are closed by means of the top 12 and bottom 13, thus forming a substantially cylindrical chamber having a lateral extension formed by the offset 11. The top 12 is formed with a stuffing-box 14, having an enlarged central opening 48 leading to the cylindrical chamber, said opening forming a passage-way for the unfiltered water carried through the inlet-pipe 45 and controlled by the movement of the cock 46, located in said pipe. The bottom 13 is provided with an opening, as shown, while to the under surface of the bottom and preferably fitted tightly thereto through the medium of a suitable gasket or washer is a supplemental bottom 49, having the downwardly-extending conical valve-seat 53. A by-pass 37 is formed in said bottom and supplemental bottom, as shown, said by-pass serving to form an outlet from the cylindrical chamber for a purpose presently described.

16 designates the supporting-stem for the filtering-stone, said stem having its lower end formed substantially as shown in Fig. 2 to form a substantially conical valve 17, which is adapted to rest in the seat 53 of the supplemental bottom, as shown in Figs. 1 and 5, the seat and periphery of the valve being preferably ground to form a tight joint. Said valve 17 carries a hand-wheel 50, held in position by means of the cap 52, said wheel forming a means for readily rotating said valve on its seat when desired. The valve is held firmly to its seat by means of the spring 51, interposed between the seat and the hand-wheel. The upper end of the stem 16 is formed tubular, as shown at 15, which tubular portion passes through an opening in the stuffing-box 14, thus providing suitable bearings for said stem at opposite ends thereof and preventing any liability of wabbling and insuring the correct positioning of the filtering-stone.

The valve 17 is provided with a central enlarged opening 21, communicating with which is a by-pass 36, extending laterally through said valve, said by-pass under certain conditions forming a continuation of the by-pass 37, heretofore described, thus forming an outlet from the cylindrical chamber to the opening 21, as shown in Fig. 1.

The upper portion of the opening 21 is reduced in size, and the valve 17 is screw-threaded, as at 34, for a portion of the distance along said reduced opening, said screw-threads being adapted to receive the screw-threaded end of the lower outlet-pipe 33 for the filtered water, said pipe having the valved cock 35 to regulate the outflow, the pipe 33 extending through the opening 21, but leaving an annular space surrounding the pipe 33, this construction affording two outlets at the bottom from the cylindrical chamber, one through the by-passes 37 36 and the other through the ports 20 and the pipe 33.

As shown, the valve 17 has its upper face formed as a shoulder 23, on which is placed a suitable washer and on the latter the filtering-stone 38, the stem 16 passing vertically through an opening formed centrally therein. The stone 38 is held in position on said valve by means of the nut 22, mounted on a screw-threaded portion of the tubular portion 15, a washer being interposed between the nut and the stone. When said nut is tightened into position, it will be seen that the stone will be held in a fixed position relative to the stem 16, being clamped on the valve 17, and therefore subject to its rotatory movement.

For the purpose of strengthening the stem 16 it is formed angular in cross-section, as best shown in Fig. 7, and of a size less than the diameter of the opening in the filtering-stone 38. This allows the entire inner periphery of the stone 38 to be free from obstructions to the passage of the water, and thereby allows the filter to be operated to its greatest extent. As will be seen, the space within the stone 38 through which the stem 16 passes is closed by the washers, and hence to form an outlet therefrom suitable ports 20 are provided at the bottom, said ports leading into the pipe 33, while similar ports 18 are formed at the upper end of said angular portion of the stem, which ports lead into the opening 19 of the tubular portion 15. From this description it will be seen that the unfiltered water enters the casing 10 through the pipe 45 and passage-way 48, and if the parts are in the position shown in Fig. 1 will pass downwardly and out through the by-passes 37 36 and the opening 21, the discharge being unfiltered water. If, however, the valve 17 is turned so as to break the continuity of the by-passes, there will be no escape for the water except by passing through the filtering-stone 38 into the central opening or chamber therein and thence through the ports 18 and 20 into the tubular portion 15 and the pipe 33, and as the unfiltered water is introduced under pressure the filtration will continue until the pressure within said central opening is equal to the pressure of the unfiltered water, whereupon the movement will cease.

24 and 25 designate the lower and upper members, respectively, of a compound stuffing-box, the member 24 of which is adapted to coact with the stuffing-box 14, said compound box serving to receive the meeting ends of the tubular portion 15 and the lower end of a union connection 54, which in turn leads to the pipe 26, leading to the deodorizing-chamber 29 of the receptacle 28. Said pipe 26 is provided with a suitable stop-cock to regulate the passage of the water through said pipe.

As shown, the deodorizing-chamber 29 is formed below the receptacle 28 and is adapted to contain suitable material 30—such, for instance, as charcoal—a screen 31 serving to retain said material in its chamber. As the filtered water is forced through the pipe 26 under pressure, (due to the pressure of the unfiltered water,) it is forced to percolate through the material 30 and passes into the receptacle 28 in a sweetened condition, from where it can be drawn as needed through the spigot 32.

While I have shown the receptacle 28 as located at the end of a pipe connected to the filtered-water chamber and above the main portion of the filter, it will be readily understood that the said receptacle and its deodorizing-chamber may be located at any other suitable point, it being necessary only that said receptacle be connected to one of the outlets for the filtered water.

As it is necessary to thoroughly cleanse the periphery of the filtering-stone at intervals, I have provided a cleansing-stone 39, substantially thin and of a length equal to or greater than the height of the filtering-stone, said cleansing-stone being located in the offset 11, as shown in Figs. 1 and 4. Said stone 39 is provided with a recess 42 on its rear edge to receive a suitable spring 40, which is adapted to contact against the face of a leaf-spring 41, the ends of which are held in contact with the stone by suitable means, while the central portion contacts against the inner end of a set-screw 47, mounted in the offset 11, as shown. As the set-screw is tightened the spring 41 will press more firmly against the stone 39, causing it to contact positively with the periphery of the filtering-stone, such contact, however, being a yielding one to permit the stone 39 to conform to any uneven surface of the filtering-stone due to soft spots.

43 43 designate tap-holes in the offset 11, by means of which the cleansing-stone may be drawn into said offset when it is desired to remove the filtering-stone, any suitable means being provided for retaining it in such position, such as by passing a hook into the loops which retain the leaf-spring in position.

44 designates a suitable tap-hole in the casing 10, by means of which the stone 38 can be readily inspected when desired.

In cleansing the stone 38 it is necessary only to rotate the valve 17 one or more times and then bring the by-passes 37 36 into communication, whereupon the opening of the cock 46 will cause any sediment removed by the cleansing-stone to be washed out of the casing through the by-passes 37 36 and the opening 21. The advantages of this construction are many and are believed to have been clearly pointed out.

It is to be understood that I do not limit myself to the specific details of construction, as I reserve the right to use any and all modifications thereof which may fall within the spirit and scope of my invention as expressed in the appended claims.

Having thus described my invention, what I claim as new is—

1. A filter comprising a casing having an inlet and an outlet for the unfiltered water; a rotatable support extending through said casing serving as a valve to control said unfiltered-water outlet, said support containing a part of said outlet; a filtering-stone carried by said support, said stone having a filtered-water chamber; and an outlet from said chamber for the filtered water.

2. A filter comprising in its construction, a casing containing a natural filtering-stone located centrally therein and having an upper and lower outlet for filtered water, said natural filtering-stone coming in contact with a spring-actuated self-adjusting cleansing-stone contained within said casing; a valve mechanism to pass unfiltered water, said valve mechanism being also arranged to retain unfiltered water between the casing and the filtering-stone and thus force the same through the filtering medium to its outlets, said valve mechanism containing a part of the passage for unfiltered water from the casing, substantially as described.

3. In a filter, the combination of the angular stem portion 16; the tubular portion 15 having the central passage 19; the ports 18 leading from said stem portion to said central passage; the conical valve 17, having the outlet-pipe 33; the ports 20 leading from said stem portion to said pipe; and the filtering-stone 38 removably secured on said stem portion, substantially as set forth.

4. The combination with a filter-case having a rotatable filtering device and a stationary cleansing device for said filtering device; of a reservoir 28 having the compartment 29 adapted to contain a deodorizing medium; the screen 31; and a stuffing-box between the said filter-casing and said reservoir, whereby the movement of said filtering device to permit cleansing thereof may be had without varying the normal position of the filtering-chambers.

5. In a filter, the combination with a casing having a filtering-stone; of an offset 11, having the adjusting-screw 47; the cleansing-stone 39; the spring 41; and the spring 40, substantially as and for the purpose set forth.

In testimony whereof I have affixed my signature in presence of two witnesses.

THEODORE LINKE.

Witnesses:
CHARLES BECKMAN,
ADAM E. SCHATZ.